United States Patent
Lee et al.

(10) Patent No.: US 8,421,414 B2
(45) Date of Patent: Apr. 16, 2013

(54) MOBILE ELECTRONIC DEVICE AND POWER MANAGEMENT METHOD OF BATTERY MODULE THEREOF

(75) Inventors: Min-Wei Lee, Taipei (TW); Tien-Peng Yu, Taipei (TW)

(73) Assignee: Pegatron Corporation, Beitou District, Taipei (TW)

( * ) Notice: Subject to any disclaimer, the term of this patent is extended or adjusted under 35 U.S.C. 154(b) by 371 days.

(21) Appl. No.: 12/886,536

(22) Filed: Sep. 20, 2010

(65) Prior Publication Data

US 2011/0109272 A1    May 12, 2011

(30) Foreign Application Priority Data

Nov. 10, 2009  (TW) ............................... 98138097 A

(51) Int. Cl.
*H02J 7/00* (2006.01)
(52) U.S. Cl.
USPC ............................ 320/132; 320/131; 320/133
(58) Field of Classification Search ........... 320/131–133
See application file for complete search history.

(56) References Cited

U.S. PATENT DOCUMENTS

| 6,304,061 B1 | 10/2001 | Toya | |
|---|---|---|---|
| 6,771,042 B2 * | 8/2004 | Chen et al. | 320/110 |
| 6,911,804 B2 * | 6/2005 | Mori | 320/132 |
| 2003/0117112 A1 * | 6/2003 | Chen et al. | 320/137 |
| 2008/0012532 A1 * | 1/2008 | Denning | 320/134 |
| 2009/0267418 A1 * | 10/2009 | Lin et al. | 307/66 |

FOREIGN PATENT DOCUMENTS

| CN | 1494192 A | 5/2004 |
|---|---|---|
| CN | 1527434 A | 9/2004 |
| CN | 1707397 A | 12/2005 |
| CN | 101132186 A | 2/2008 |
| JP | 200494607 A | 3/2004 |
| TW | 530429 | 5/2003 |
| TW | 200843286 | 11/2008 |
| TW | 200945016 | 11/2009 |

OTHER PUBLICATIONS

Machine translation of TW 200843286, Publication date, Nov. 1, 2008.*

* cited by examiner

*Primary Examiner* — Samuel Berhanu
(74) *Attorney, Agent, or Firm* — Winston Hsu; Scott Margo

(57) ABSTRACT

This invention relates to a mobile electronic device and a power management method of a battery module thereof. The mobile electronic device includes a battery module, a charging/discharging module, and a control module. The charging/discharging module is coupled with the battery module. The control module is coupled with the battery module and the charging/discharging module. When the power supply is coupled with the mobile electronic device and the system time is not within a maintenance period, the control module controls the charging/discharging module to maintain capacity of the battery module within a first capacity range. When the power supply is coupled with the mobile electronic device and the system time is within the maintenance period, the control module controls the charging/discharging module to maintain the capacity of the battery module within a second capacity range.

7 Claims, 4 Drawing Sheets

MOBILE ELECTRONIC DEVICE AND POWER MANAGEMENT METHOD OF BATTERY MODULE THEREOF

CROSS-REFERENCE TO RELATED APPLICATIONS

This Non-provisional application claims priority under 35 U.S.C. §119(a) on Patent Application No(s). 098138097 filed in Taiwan, Republic of China on Nov. 10, 2009, the entire contents of which are hereby incorporated by reference.

BACKGROUND OF THE INVENTION

1. Field of the Invention

This invention relates to a mobile electronic device and, more particularly, to a mobile electronic device and a power management method of a battery module thereof.

2. Description of the Related Art

In an environment that an external power source (such as a commercial power socket) can be used, generally, when a user uses a portable computer, he or she may still habitually connect a power supply to the portable computer, thereby using the power supply to convert external alternating current power to direct current power thus to provide power for the portable computer. In this condition, the user may generally leave a rechargeable battery in the computer, and the portable computer may charge the rechargeable battery.

FIG. 1 is a schematic diagram showing accumulating capacity in a conventional rechargeable battery. That is, FIG. 1 is a schematic diagram showing a curve of changes in capacity of a rechargeable battery of a conventional portable computer. Since a power adapter circuit can charge the rechargeable battery when providing direct current power for the computer, the capacity stored in the rechargeable battery is shown as the curve in FIG. 1. The rechargeable battery is gradually charged from a charging state 101 to a full capacity state 102 and continuously maintains the full capacity state 102.

According to the above method that the rechargeable battery maintains the full capacity state, when the portable computer is carried to the outside, the computer can be operated via the power supplied by the rechargeable battery at once for the longest usable time. However, the above method has negative influence on the lifespan of the rechargeable battery. Usable accumulating capacity of the rechargeable battery has a characteristic. That is, when the actual capacity stored in the rechargeable battery maintains a high level for a time, the usable accumulating capacity of the rechargeable battery may be gradually weakened. Therefore, after a long time, the usable accumulating capacity of the rechargeable battery may reduce to fail to provide the power.

FIG. 2 is a schematic diagram showing weakening changes in the usable accumulating capacity of the rechargeable battery over time. FIG. 2 shows changes in the usable accumulating capacity of the rechargeable battery after the rechargeable batter storing different capacity is not used for one year. According to a first curve 202, if a rechargeable battery maintaining one hundred percent storing capacity is not used for one year, the usable accumulating capacity of the rechargeable battery is weakened to ninety percent of the original usable accumulating capacity.

According to a second curve 204, if a rechargeable battery maintaining forty percent storing capacity is not used for one year, the usable accumulating capacity of the rechargeable battery is weakened to ninety-seven percent of the original usable accumulating capacity.

According to a third curve 206, if a rechargeable battery without storing capacity is not used for one year, the usable accumulating capacity of the rechargeable battery can almost still maintain the original usable accumulating capacity.

According to FIG. 2, the following conclusion can be obtained. The higher capacity stored in the rechargeable battery is, after a period of time, the lower the usable accumulating capacity of the rechargeable battery is.

To improve weakening of the usable accumulating capacity of the rechargeable battery, in the prior art, a user may perform fully discharging operation for the rechargeable battery at regular intervals, such that the whole capacity stored in the rechargeable battery does not maintain a high capacity state, further to maintain the usable accumulating capacity of the rechargeable battery. According to the above method, in one aspect, the user needs to perform the fully discharging operation periodically, which causes inconvenience for the users. In another aspect, the whole charging and discharging times of the rechargeable battery is limited. Although the above method can be used to maintain the whole accumulating capacity of the battery, the remaining charge times of the rechargeable battery is reduced.

BRIEF SUMMARY OF THE INVENTION

One objective of this invention is to provide a mobile electronic device and a power management method of a battery module thereof to improve the prior art.

According to one aspect, a mobile electronic device cooperating with a power supply is provided, The mobile electronic device has system time. The mobile electronic device includes a battery module, a charging/discharging module, and a control module. The charging/discharging module is coupled with the battery module. The control module is coupled with the battery module and the charging/discharging module. When the power supply is coupled with the mobile electronic device and the system time is not within a maintenance period, the control module controls the charging/discharging module to maintain capacity of the battery module within a first capacity range. When the power supply is coupled with the mobile electronic device and the system time is within the maintenance period, the control module controls the charging/discharging module to maintain the capacity of the battery module within a second capacity range. The capacity of the second capacity range is higher than that of the first capacity range.

According to another aspect of the invention, a power management method of a battery module is provided. The power management method can be used in a mobile electronic device having system time. The power management method includes the following steps. Whether the mobile electronic device is coupled with the battery module and a power supply is determined. If the mobile electronic device is coupled with the battery module and the power supply, whether the system time of the mobile electronic device is within the maintenance period is determined. If the system time of the mobile electronic device is not within the maintenance period, the capacity of the battery module is maintained within the first capacity range. If the system time of the mobile electronic device is within the maintenance period, the capacity of the battery module is maintained within a second capacity range. The capacity of the second capacity range is higher than that of the first capacity range.

In the invention, in the condition that the usable charging times of the rechargeable battery is not affected, the mobile electronic device can still allow the capacity of the rechargeable battery to maintain the usable accumulating capacity of the rechargeable battery, thus to prolong the lifespan of the rechargeable battery.

These and other features, aspects, and advantages of the present invention will become better understood with regard to the following description, appended claims, and accompanying drawings.

DETAILED DESCRIPTION OF THE INVENTION

Figure 1:
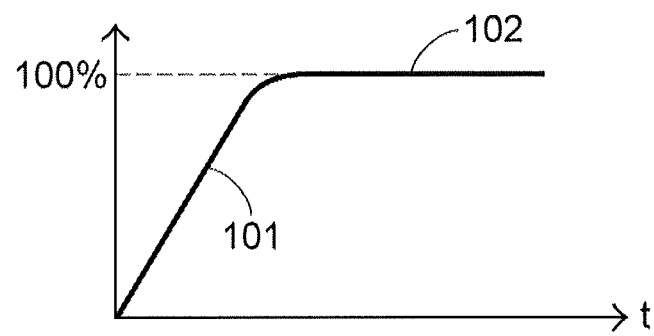
FIG. 1 is a schematic diagram showing accumulating capacity of a conventional charging battery.
Figure 2:
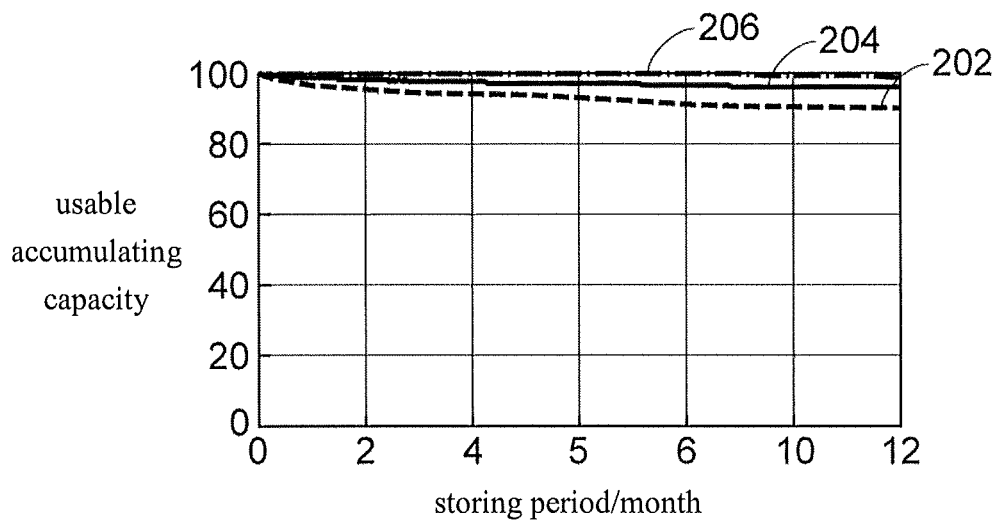
FIG. 2 is a schematic diagram showing weakening changes in the usable accumulating capacity of the charging battery.
Figure 3:
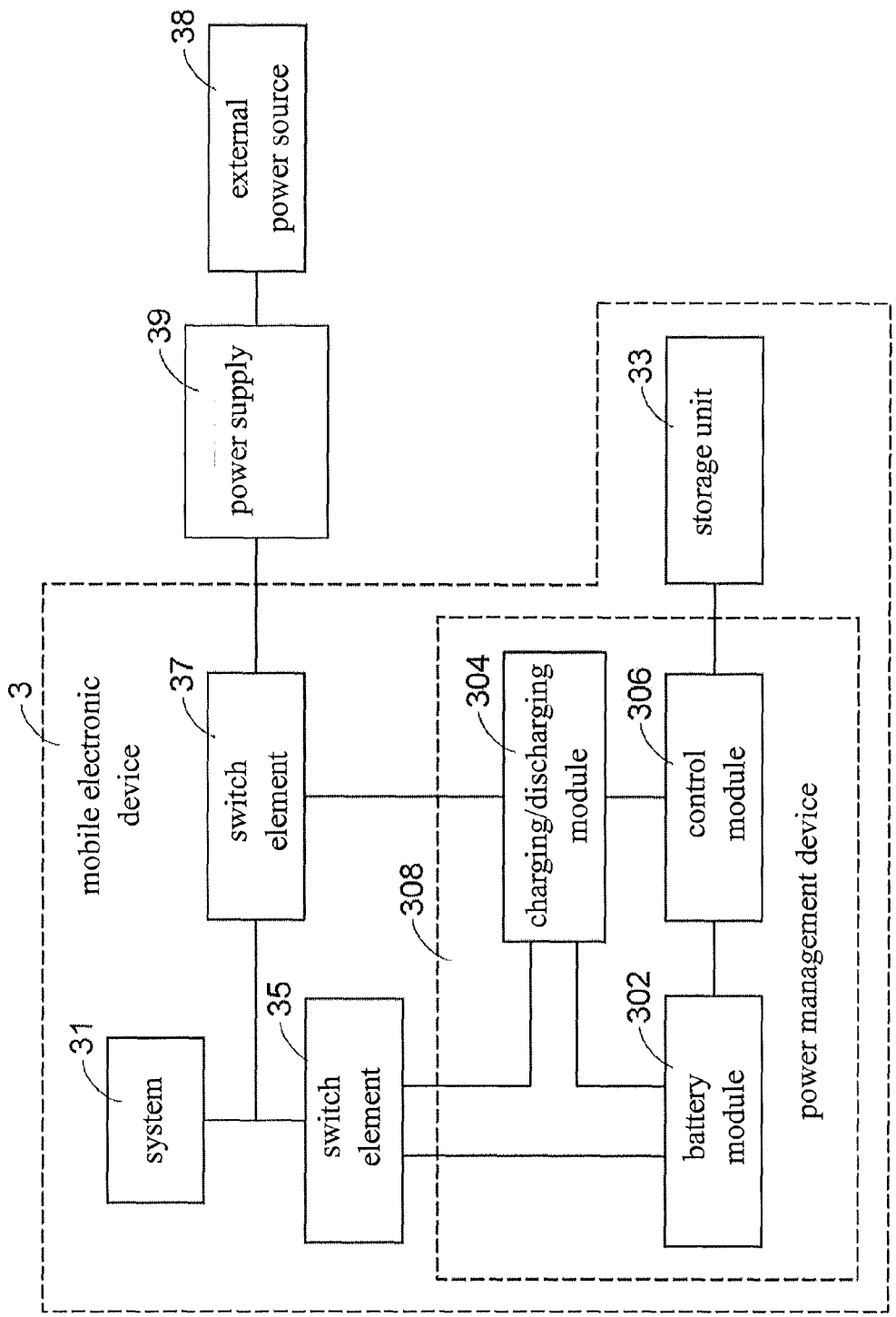
FIG. 3 is a schematic diagram showing related modules of a mobile electronic device and a power supply.

FIG. 3 is a schematic diagram showing related modules of a mobile electronic device and a power supply. In FIG. 3, a mobile electronic device 3 in the embodiment can cooperate with an external power supply 39. One terminal of the power supply 39 is coupled with an external power source 38, and the other terminal of the power supply 39 is coupled with the mobile electronic device 3. Generally speaking, the power supply 39 is used for converting inputted alternating current voltage to outputted direct current voltage. In other embodiments, the power supply 39 may also be built in the mobile electronic device 3.

The mobile electronic device 3 includes a system 31, switch elements 35, 37, a power management device 308, and a storage unit 33. The power management device 308 further includes a battery module 302, a charging/discharging module 304, and a control module 306.

The switch element 35 is coupled with the system 31, the battery module 302, and the charging/discharging module 304, respectively. The switch element 37 is coupled with the switch element 35, the system 31, the charging/discharging module 304, and the power supply 39, respectively. The charging/discharging module 304 is coupled with the battery module 302 and the control module 306. The control module 306 is coupled with the battery module 302, the charging/discharging module 304, and the storage unit 33.

In the embodiment, the mobile electronic device 3 may be a portable computer such as a notebook computer or a tablet computer. In the embodiment, the control module 306 may be an embedded controller (EC). In the embodiment, the storage unit 33 may be a memory storing a basic input/output system (BIOS), such as a flash memory, a volatile memory, or a non-volatile memory.

In the embodiment, the system 31 is a general description and it can include all system circuits and related elements expect the power management device 308, the storage unit 33, and the switch elements 35, 37. In the embodiment, capacity of the battery module 302 can be maintained within a first capacity range or a second capacity range. The capacity of the second capacity range is higher than that of the first capacity range. The description about the capacity ranges is described hereinbelow.

In the embodiment, the switch element 35 is used for switching whether the battery module 302 supplies power for the system 31. The switch element 37 is used for switching whether the power supply 39 supplies power for the system 31 and whether the charging/discharging module 304 is used to charge the battery module 302. In the embodiment, the operation of the switch elements 35, 37 is controlled by the charging/discharging module 304 and the control module 306.

In other embodiments, the switch element 35 and the switch element 37 can be integrated into a switch unit for switching a charging/discharging path of the battery module 302 and/or the system 31.

In the embodiment, the control module 306 can correspondingly control the capacity of the battery module 302 according to different conditions. For example, the control module 306 can read related setting values from the storage unit 33 to perform related operation. Otherwise, the control module 306 may obtain a capacity state of the battery module 302 when the mobile electronic device 3 is used, thereby determining whether to control the charging/discharging module 304 to charge or discharge the battery module 302.

Figure 4:
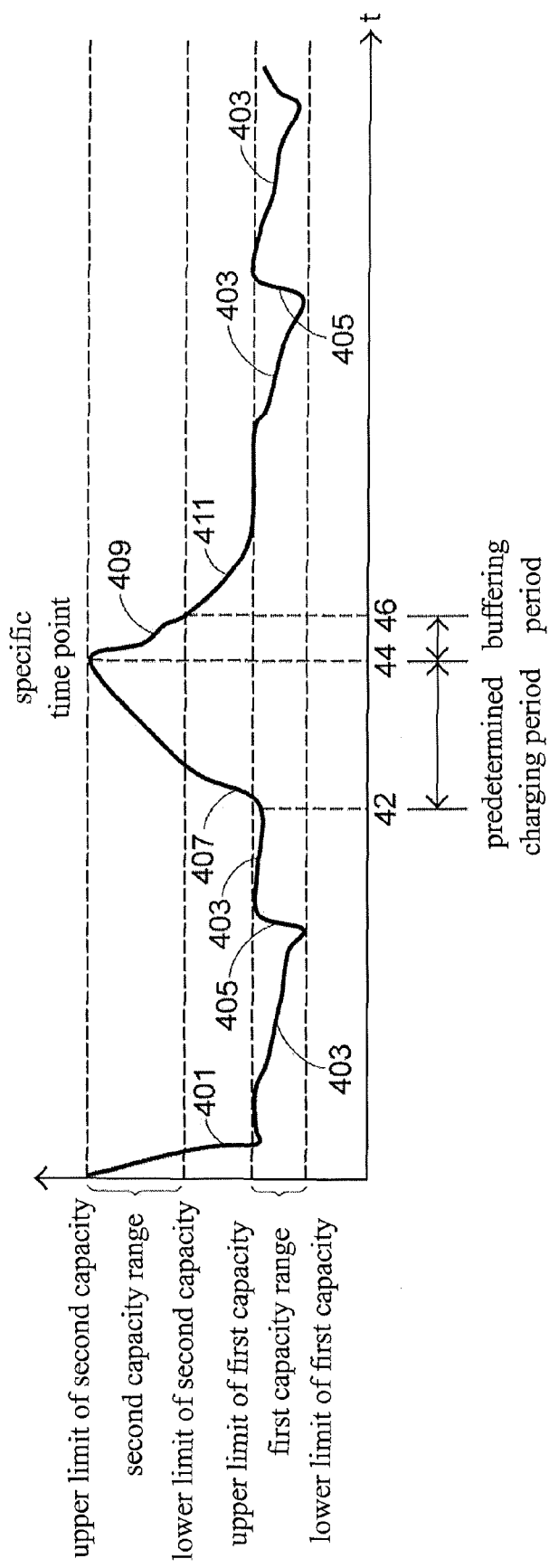
FIG. 4 is a schematic diagram showing battery capacity according to one embodiment of the invention.

FIG. 4 is a schematic diagram showing battery capacity according to one preferred embodiment of the invention. That is, a curve diagram showing the capacity of the battery module 302 in different conditions. Please refer to FIG. 4 and FIG. 3 together.

According to the above, the capacity of the battery module 302 in the embodiment can be operated in different capacity ranges.

In the embodiment, the first capacity range is that the capacity of the battery module 302 is in a low capacity state. When the capacity of the battery module 302 is in the first capacity range, the battery module 302 can provide enough power to safely complete the operation program of the mobile electronic device 3 and to execute shutdown as the external power source 38 suddenly stops providing the power for the mobile electronic device 3.

In the embodiment, the second capacity range is that the capacity of the battery module 302 is in a high capacity state. In the embodiment, usually before the user carries the mobile electronic device 3 to the outside, the control module 306 can adjust the capacity of the battery module 302 to the high capacity state, and the control module 306 can control the battery module 302 to maintain the capacity thereof within the second capacity range in a maintenance period.

In the embodiment, the maintenance period can include a predetermined charging period and a buffering period, and the buffering period follows the predetermined charging period. In the embodiment, the predetermined charging period is calculated via specific time point 44 and battery charging time. In the embodiment, the buffering period is a system predetermined value. However, the user can perform limited amendment according to needs.

In the embodiment, in FIG. 4, when the power supply 39 is coupled with the mobile electronic device 3 and the mobile electronic device 3 is installed with the battery module 302, the control module 306 can control the charging/discharging module 304 to control operation of the switch elements 35, 37, thus to allow the power supply 39 to provide the power for the system 31, and the control module 306 can control the charging/discharging module 304 to maintain the capacity of the battery module 302 within the first capacity range.

A user can further perform related settings for the maintenance period in a BIOS environment. Otherwise, the user can also perform related settings for the maintenance period via application programs in an operating system environment.

Thereby, the control module 306 can control the charging/discharging module 304 to charge or discharge the battery module 302 according to different settings performed by the users or the system predetermined values. For example, in the predetermined charging period, the control module 306 may control the charging/discharging module 304 to charge the battery module 302 thus to maintain the capacity thereof within the second capacity range.

The above different settings and the predetermined values of the system can be stored in the storage unit 33 or be directly stored in a memory (not shown) of the control module 306. Thereby, the control module 306 can read related setting values from the storage unit 33 to perform subsequent related operation. How to control the battery module 302 in the embodiment is described hereinbelow.

Please refer to FIG. 3 and FIG. 4 together. To simplify the following description, in the embodiment, a lower limit and an upper limit of the first capacity are further used to define the first capacity range representing the low capacity state, and a lower limit and an upper limit of the second capacity are used to define the second capacity range representing the high capacity state.

The capacity limits of the battery module 302 may be shown as follows. The lower limit of the first capacity may be between five percent and fifteen percent of the whole capacity of the battery module 302. The upper limit of the first capacity may be between ten percent and twenty percent of the whole capacity of the battery module 302. The lower limit of the second capacity may be between ninety percent and ninety-five percent of the whole capacity of the battery module 302. The upper limit of the second capacity may be one hundred percent of the whole capacity of the battery module 302 (fully charged).

When the power supply 39 is connected with the external power source 38, and the power supply 39 supplies the power for the mobile electronic device 3 coupled with the battery module 302, supposing that at that moment the capacity of the battery module 302 is fully charged or higher than the upper limit of the first capacity, in the embodiment, the control module 306 can control the switch elements 35, 37 to prevent the power supplied by the power supply 39 from being provided for the battery module 302 via the charging/discharging module 304. In addition, the control module 306 can further control the charging/discharging module 304 to discharge the battery module 302 (a curved 401) until the capacity in the battery module 302 is lower than the upper limit of the first capacity.

Then, the battery module 302 performs natural capacity weakening (a curve 403) by itself. If the natural capacity weakening makes the capacity of the battery module 302 lower than the lower limit of the first capacity, the control module 306 controls the switch elements 35, 37 and the charging/discharging module 304 to charge the battery module 302 thus to allow the stored capacity to reach the upper limit of the first capacity (a curve 405). Afterwards, the battery module 302 performs the natural capacity weakening (a curve 403) until the portable computer enters into a starting point 42 of the predetermined charging period.

The predetermined charging period can be calculated via the specific time point 44 and the battery charging time. For example, if a user is to attend a meeting at ten o'clock in the morning, and the battery charging time of the battery module 302 is twenty minutes, the predetermined charging period may be from forty past nine in the morning to ten o'clock in the morning, and the starting point 42 of the predetermined charging period may be forty past nine in the morning.

In other embodiments, the predetermined charging period may be obtained in other methods, and it may be stored in the storage unit 33.

In the predetermined charging period (that is, a period between the starting point 42 of the predetermined charging period and a predetermined time point of going out 44), the control module 306 determines the capacity of the battery module 302 and maintains the capacity of the battery module 302 within the second capacity range. For example, the control module 306 may control the charging/discharging module 304 to charge the battery module 302 (a curved 407) thus to allow the capacity of the battery module 302 to reach the second capacity range formed by the lower limit of the second capacity and the upper limit of the second capacity.

When the predetermined charging period expires, before a finishing point 46 of the following buffering period, the control module 306 can control the charging/discharging module 304 to maintain the capacity of the battery module 302 within the second capacity range. Therefore, in the maintenance period including the predetermined charging period and the buffering period, the control module 306 can maintain the capacity of the battery module 302 within the second capacity range.

A user may have delays at the predetermined time point of going out 44 and fails to stop using the external power source 38 at the predetermined time point of going out 44. Therefore, the buffering period can avoid the condition that the battery module 302 is automatically discharged by the charging/discharging module 304 to a low capacity state (a curve 409) after the battery module 302 is charged to a high capacity state and when there is difference between the actual time of going out and the predetermined time point of going out 44.

In the embodiment, the buffering period can be predetermined to be twenty minutes. In other embodiments, the user can set the buffering period according to needs.

If the buffering period expires, and the user still does not stop using the power supply 39, to prevent the battery module 302 from continuously maintaining the high capacity state to affect the lifespan of the battery module 302, the control module 306 in the embodiment can control the charging/discharging module 304 to discharge the battery module 302 (a curve 411).

In the embodiment, the battery module 302 is discharged to allow the capacity to be reduced to the upper limit of the first capacity, and then the capacity of the battery module 302 is maintained within the first capacity range. That is, once the capacity of the battery module 302 naturally weakens from the upper limit of the first capacity to the lower limit of the first capacity (a curve 403), the charging/discharging module 304 charges the battery module 302 to the upper limit of the first capacity (a curve 405). Thus, the capacity controlling flow paths corresponding to different states can be performed repeatedly. The battery module 302 can be in the low capacity state when it does not need to supply the power for the portable computer, further to maintain the usable accumulating capacity of the battery module 302 to prolong the lifespan of the battery module 302.

Figure 5:
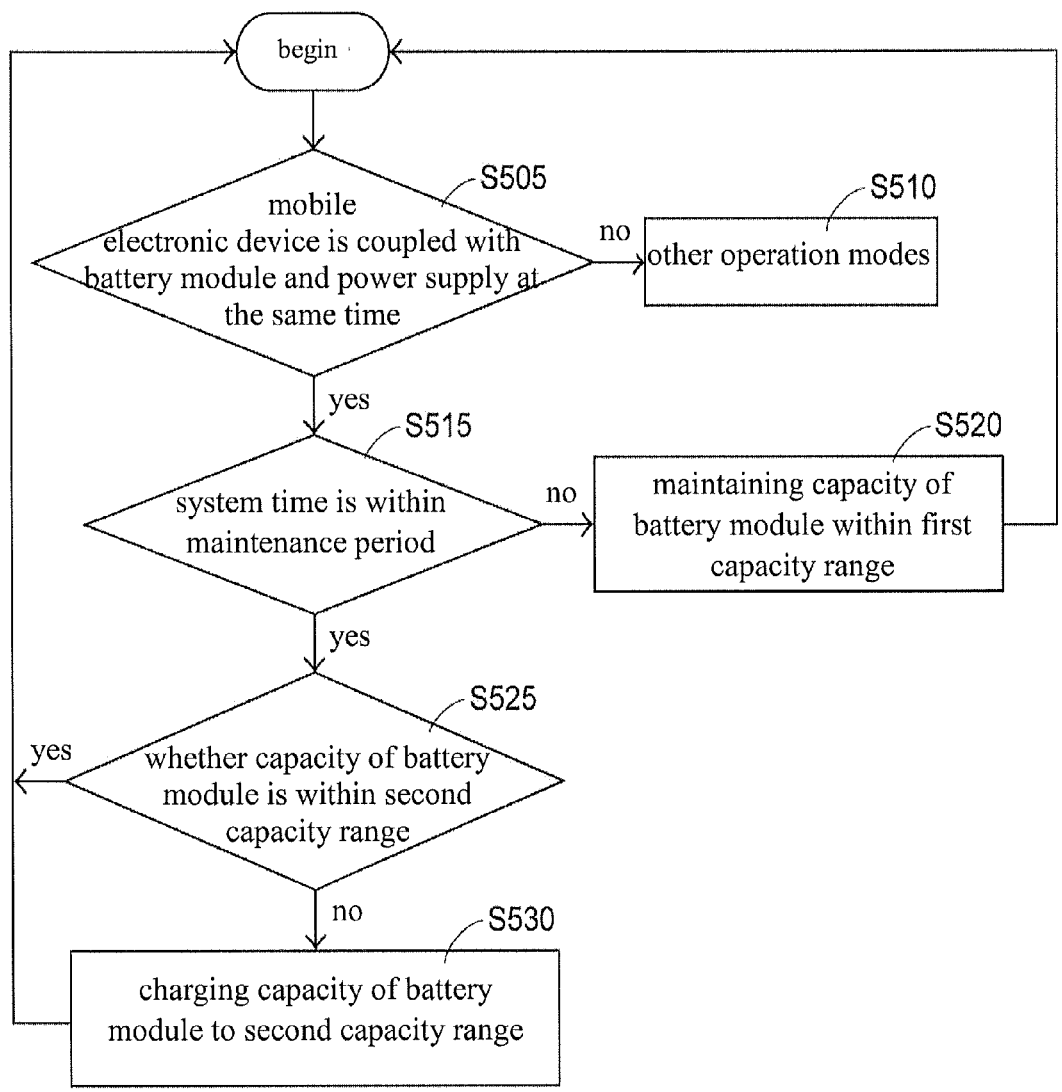
FIG. 5 is a flowchart showing a power management method of a battery module according to one preferred embodiment of the invention.

FIG. 5 is a flowchart showing a power management method of a battery module according to one preferred embodiment of the invention. Please refer to FIG. 5 and FIG. 3 together.

In step S505, the control module 306 determines whether the mobile electronic device 3 is coupled with the battery module 302 and the power supply 39 at the same time. If the mobile electronic device 3 is only coupled with one of the power supply 39 and the battery module 302, the mobile electronic device 3 can perform other operation modes according to original settings (step S510).

In step S515, if the mobile electronic device 3 is coupled with the battery module 302 and the power supply 39 at the same time, the control module 306 reads the system time and read setting values of the predetermined charging period and the buffering period from the storage unit 33 to determine whether the system time is within the maintenance period.

In step S520, if the system time of the mobile electronic device 3 is not within the maintenance period, the control module 306 controls switch elements 35, 37 and the charging/discharging module 304 to maintain the capacity of the battery module 302 within the first capacity range.

In step S525, if the system time of the mobile electronic device 3 is within the maintenance period, the control module 306 determines whether the capacity of the battery module 302 is within the second capacity range. That is, the control module 306 determines whether the battery module 302 is fully charged. If the capacity of the battery module 302 is within the second capacity range (fully charged), step S505 is continuously performed.

In step S530, if the capacity of the battery module 302 is not within the second capacity range, the control module 306 controls the switch elements 35, 37 and the charging/discharging module 304 to maintain the capacity of the battery module 302 within the second capacity range. Afterwards, step S505 is continuously performed.

The operation flow paths of the portable computer are just taken for example. However, the method in the embodiment can be used in the conditions that different kinds of the mobile electronic devices such as a mobile phone or a multimedia player and so on are connected with an external power source. The material of the battery module is not limited, and a nickel-metal battery, a nickel-cadmium battery, a lithium ion battery, or a lithium battery can all be used. When the external power source is used, in the embodiment, the setting values stored in the storage unit such as setting values of the BIOS can be provided for the control module as auxiliary determination during control of the charging/discharging module. Besides the upper limits and the lower limits of the capacity ranges, the stored setting values further includes a switch point when the external power mode is switched into a battery mode, a regular charging/discharging period, and settings of the maintenance period. The setting values can use factory defaults or use setting values set by users via a software interface according to user's preferences.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A mobile electronic device cooperating with a power supply, the mobile electronic device having system time, the mobile electronic device comprising:
   a battery module;
   a charging/discharging module coupled with the battery module; and
   a control module coupled with the battery module and the charging/discharging module,
   wherein when the power supply is coupled with the mobile electronic device and the system time is not within a maintenance period, the control module controls the charging/discharging module to maintain capacity of the battery module within a first capacity range, when the power supply is coupled with the mobile electronic device and the system time is within the maintenance period, the control module controls the charging/discharging module to maintain the capacity of the battery module within a second capacity range, and the capacity of the second capacity range is higher than that of the first capacity range,
   wherein the maintenance period comprises a predetermined charging period and a buffering period, and the buffering period follows the predetermined charging period.

2. The mobile electronic device according to claim 1, further comprising a storage unit coupled with the control module, the storage unit storing values of the first capacity range, the second capacity range, and the maintenance period.

3. The mobile electronic device according to claim 1, further comprising
   a first switch element coupled with the power supply and the
   charging/discharging module.

4. The mobile electronic device according to claim 1, further comprising
   a second switch element coupled with the battery module and the
   charging/discharging module.

5. A power management method of a battery module used in a mobile electronic device, the mobile electronic device having system time, the power management method comprising the following steps of:
   determining whether the mobile electronic device is coupled with a battery module and a power supply;
   if the mobile electronic device is coupled with the battery module and the power supply, determining whether the system time is within a maintenance period;
   if the system time of the mobile electronic device is not within the maintenance period, maintaining capacity of the battery module within a first capacity range; and
   if the system time of the mobile electronic device is within the maintenance period, maintaining the capacity of the battery module within a second capacity range, the capacity of the second capacity range being higher than that of the first capacity range;
   wherein the maintenance period comprises a predetermined charging period and a buffering period, and the buffering period follows the predetermined charging period.

6. The power management method according to claim 5, wherein the predetermined charging period is calculated via a specific time point and battery charging time.

7. The power management method according to claim 5, wherein the buffering period is a system predetermined value.

* * * * *